US010670088B2

(12) United States Patent
Yamaguchi et al.

(10) Patent No.: US 10,670,088 B2
(45) Date of Patent: Jun. 2, 2020

(54) HYDRAULIC CLUTCH DEVICE

(71) Applicant: HONDA MOTOR CO., LTD., Tokyo (JP)

(72) Inventors: Nobutaka Yamaguchi, Wako (JP); Kenji Niwata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 15/915,505

(22) Filed: Mar. 8, 2018

(65) Prior Publication Data

US 2018/0259007 A1 Sep. 13, 2018

(30) Foreign Application Priority Data

Mar. 10, 2017 (JP) .................................. 2017-046829

(51) Int. Cl.
*F16D 25/02* (2006.01)
*F16D 25/08* (2006.01)
(Continued)

(52) U.S. Cl.
CPC ............. *F16D 25/14* (2013.01); *F16D 13/52* (2013.01); *F16D 25/0638* (2013.01); *F16D 25/083* (2013.01); *F16D 2300/26* (2013.01)

(58) Field of Classification Search
CPC ...... F16D 25/14; F16D 13/52; F16D 25/0638; F16D 2300/26; F16D 25/083
See application file for complete search history.

(56) References Cited

U.S. PATENT DOCUMENTS 3,713,351 A * 1/1973 Sakakibara ............. F16H 59/66
477/61
4,458,797 A 7/1984 Hawkins
(Continued)

FOREIGN PATENT DOCUMENTS

CN 101445142 A 6/2009
CN 108506364 A 9/2018
(Continued)

OTHER PUBLICATIONS

Office Action dated Aug. 28, 2018, issued in counterpart Japanese application No. 2017-046829, with English translation. (8 pages).
(Continued)

*Primary Examiner* — Tinh Dang
(74) *Attorney, Agent, or Firm* — Westerman, Hattori, Daniels & Adrian, LLP (57) ABSTRACT

A hydraulic clutch device includes a pressure regulating valve located on a downstream side in an oil flowing direction, a casing housing the hydraulic clutch, an insertion hole holding at least a part of the pressure regulating valve, an upstream side oil passage having an opening part introducing the oil from the hydraulic clutch into the insertion hole, and a downstream side oil passage having another opening part discharge the oil from the other opening part to the downstream side of the insertion hole. A position of a first virtual line (L1) which passes through the center-of-gravity point of a cross section of the opening part of the upstream side oil passage and a position of a second virtual line (L2) which passes through the center-of-gravity point of a cross section of the insertion hole are arranged so as to be different from each other.

4 Claims, 5 Drawing Sheets

(51) Int. Cl.
    *F16D 13/52*     (2006.01)
    *F16D 25/0638*   (2006.01)
    *F16D 48/02*     (2006.01)

(56) References Cited

U.S. PATENT DOCUMENTS

| | | | |
|---|---|---|---|
| 4,907,684 A | 3/1990 | Breisch | |
| 8,997,916 B2* | 4/2015 | Norita | B60W 10/023 |
| | | | 180/336 |
| 9,056,545 B2* | 6/2015 | Norita | F16H 61/0009 |
| 9,316,270 B2* | 4/2016 | Mitsubori | F16D 25/06 |
| 9,688,140 B2* | 6/2017 | Saegusa | F16D 25/12 |

FOREIGN PATENT DOCUMENTS

| | | |
|---|---|---|
| JP | 60-263732 A | 12/1985 |
| JP | H04-307148 A | 10/1992 |
| JP | 2007-147021 A | 6/2007 |
| JP | 2011-149535 A | 8/2011 |
| JP | 5844506 B1 | 1/2016 |

OTHER PUBLICATIONS

Office Action dated Apr. 30, 2019, issued in counterpart CN Application No. 201810194173.X, with English machine translation. (11 pages).

Search Report dated Apr. 23, 2019, issued in counterpart CN Application No. 201810194173.X. (2 pages).

Office Action dated Sep. 29, 2019, issued in counterpart CN application No. 201810194173.X, with English translation. (11 pages).

Office Action dated Mar. 16, 2020, issued in counterpart CN Application No. 201810194173.X, with English translation (11 pages).

* cited by examiner

Fig.1

X-X SECTION

Fig.2

A PART

HYDRAULIC CLUTCH DEVICE

CROSS-REFERENCE OF RELATED APPLICATION

This application claims priority of Japanese Patent Application No. 2017-046829 filed in Japan on Mar. 10, 2017, the entire contents of which are incorporated herein by reference.

TECHNICAL FIELD

The present invention relates to a hydraulic clutch device provided with a pressure regulating valve for pressure-regulating oil which is discharged from an oil pump and a hydraulic clutch to be engaged by the oil pressure-regulated by the pressure regulating valve.

Background Art

A hydraulic clutch for switching the presence and absence of the power transmission and adjusting a power transmission amount is provided in a power transmission route of a vehicle or the like. Then, as an oil pressure control device for feeding the oil (hydraulic oil) to the hydraulic clutch, there is known the oil pressure control device provided with an oil strainer which collects the oil, an oil pump which pumps up the oil from the oil strainer and feeds it to the hydraulic clutch, a piston chamber (oil chamber) which operates a piston for engaging the hydraulic clutch, and a pressure regulating valve (linear solenoid valve) which pressure-regulates the oil to a predetermined pressure (oil pressure) (for example, see Japanese Patent No. 5844506).

In the oil pressure control device described in Japanese Patent No. 5844506, the oil pumped up by the oil pump from the oil strainer passes through an oil passage on a supply side and is fed to the piston chamber of a hydraulic piston. Thereafter, it is fed to the pressure regulating valve through an oil passage on a return side. Then, after being pressure-regulated to the predetermined pressure in this pressure regulating valve, a part of the oil is returned to the oil strainer, and the rest of the oil is fed for lubrication of rotational sliding parts such as a bearing, a clutch and the like.

By the way, in the hydraulic clutch device described in Japanese Patent No. 5844506, the pressure regulating valve (linear solenoid valve) for regulating an oil pressure is arranged on the downstream side of the oil chamber (piston chamber) of the hydraulic clutch. In the hydraulic clutch of such configuration, when the resistance (conduit resistance) of the oil passage on the discharge side through which the oil discharged from the pressure regulating valve circulates is increased and exerts an influence on a discharge capacity (oil discharge capacity) of the oil discharged from the pressure regulating valve, there may be cases where the pressure (operation pressure of the hydraulic clutch) is generated within the oil chamber (piston chamber) of the hydraulic clutch even in a state of lacking an instruction oil pressure. Especially, in the case where the hydraulic clutch of the above configuration is used for a drive device for sub-driving wheels of a four wheel, drive vehicle (rear differential unit, etc., when rear wheels are the sub-driving wheels), the above problem is easily generated since the viscosity of the oil becomes higher under a very low temperature environment whereby the resistance (conduit resistance) of the oil passage on the discharge side is increased. This may cause such a disadvantage as dragging and the like in the hydraulic clutch. Therefore, the countermeasure for reducing the resistance of the oil passage on the discharge side through which the oil discharged from the pressure regulating valve circulates becomes necessary.

There are needs of solving problems of the background art and providing a hydraulic clutch device which is capable of reducing the resistance of an oil passage on the discharge side through which oil discharged from a pressure regulating valve circulates, thereby preventing generation of an operation pressure in a hydraulic clutch in a state of lacking an instruction oil pressure.

SUMMARY OF INVENTION

In order to achieve the above referred object, a hydraulic clutch device according to one embodiment of the present invention comprises an oil pump (7), a pressure regulating/controlling) valve (8) for pressure-regulating/controlled oil discharged from the oil pump, a hydraulic clutch (5) being engaged by the oil pressure-regulated by the pressure regulating valve, wherein the pressure regulating valve is located on a downstream side in an oil flowing direction of the hydraulic clutch, a casing (58) for housing the hydraulic clutch, an insertion hole (61) being provided in the casing and configured to fit at least apart of the pressure regulating valve (8) therein, an upstream side oil passage (67) having an opening part (67a) which opens into the insertion hole and introducing the oil discharged from the hydraulic clutch, from the opening part into the insertion hole, and a downstream side oil passage (60) having other opening part (60a) which opens into the insertion hole and leads out the oil from the other opening part to the downstream side of the insertion hole, wherein a position of a first virtual line (L1) which passes through the center-of-gravity point of a cross section of the opening part (67a) of the upstream side oil passage a long the axial direction of the upstream side oil passage (67) and a position of a second virtual line (L2) which passes through the center-of-gravity point of a cross section of the insertion hole along the axial direction of the insertion hole are arranged so as to be different from each other. Further, in this case, the first virtual line (L1) and the second virtual line (L2) may be located in a position perpendicular to each other such as extending in locations away from each other so that they do not have a point intersecting with each other.

According to the hydraulic clutch device another embodiment of the present invention, since the position of the center-of-gravity point of the opening part and the position of the center-of-gravity point of the insertion hole of the upstream side oil passage are arranged so as to be different (offset) from each other, it is possible to ensure a seal part between the opening part of the upstream side oil passage and the opening part of the downstream side oil passage in an inner circumferential surface of the insertion hole even if the diameter dimension of the downstream side oil passage is increased. Therefore, the oil flowing into the insertion hole from the opening part of the upstream side oil passage can be effectively prevented from flowing out directly from the opening part of the downstream side without the intervention of the pressure regulating valve. Thus, the oil can be prevented from flowing directly (the so-called "shortcutting") into the downstream side oil passage from the upstream side oil passage without passing though an interior of the insertion hole (the pressure regulating valve) while reducing the resistance (the conduit resistance) of the downstream side oil passage by increasing the diameter dimension thereof, so that it is possible to ensure the operation performance of the pressure regulating valve. Accordingly, the discharge capacity of the oil which is discharged to the downstream side of the pressure regulating valve through the downstream side oil passage is improved, whereby to prevent an operation pressure from being generated in a hydraulic clutch in a state of lacking an instruction oil pressure. Thus, it is possible to reduce the possibility of causing a disadvantage such as dragging and the like in the hydraulic clutch.

Further, in this hydraulic clutch device, the first virtual line (L1) may be located on a higher side than the second virtual line (L2) in the height direction.

According to this configuration, since the first virtual line (L1) is located above the second virtual line (L2) in the height direction, the opening part of the upstream side oil passage is arranged in a higher position than a center of the insertion hole. Therefore, since the opening part of the downstream side oil passage can be arranged in a lower position than the center of the insertion hole, the discharge capacity of the oil which is discharged through the downstream side oil passage can toe further improved. Further, since the Seal part between the opening part of the upstream side oil passage and the opening part of the downstream side oil passage can be made larger in dimension, the oil can be more effectively prevented from flowing directly into a downstream side oil passage hole from an upstream side oil passage hole not through the interior of the insertion hole (the pressure regulating valve).

Further, in this hydraulic clutch device, the hydraulic clutch may include friction engagement elements (members) (53, 54) provided in a power transmission route, a pressing member (57) applying pressing force to the friction engagement elements, an oil chamber (59) for driving the pressing member by an oil pressure of introduced oil, and an energizing (pressurized/spring) member (45) for energizing (pushing) the pressing member in a direction to separate from the friction engagement elements in opposition to the oil pressure of the oil chamber. The upstream side oil passage is an oil passage which provides communication from the oil chamber to the insertion hole. The diameter dimension and the length dimension of the upstream side oil passage and the downstream side oil passage are set such that a combined (sum or total) pressure consisting of a resistance pressure (P1) applied to the oil which circulates through the upstream side oil passage, a resistance pressure (P2) applied to the oil which passes through the pressure regulating valve, and a resistance pressure (P3) applied to the oil which circulates though the downstream side oil passage is smaller than the oil pressure P4 of the oil chamber which balances a load applied to the pressing member from the energizing member (P1+P2+P3<P4).

According to this configuration, since the pressing member can be returned by the energization of the energizing member in the direction to separate from the friction engagement elements in a state of lacking the instruction oil pressure of the hydraulic clutch, the generation of the operation pressure within the oil chamber of the hydraulic clutch can be effectively prevented. Thus, it is possible to more effectively reduce the possibility of causing a disadvantage such as dragging and the like in the hydraulic clutch.

Incidentally, the above reference numerals in parentheses designate, for reference, corresponding reference numerals in the drawings of component elements in an embodiment to be referred to later.

Effect of the Embodiments

The hydraulic clutch device according to embodiments of the present invention can improve a discharge capacity of oil which passes through a downstream side oil passage and is discharged to a downstream side of a pressure regulating vale, thereby to prevent an operation pressure from being generated in a hydraulic clutch in a state of lacking an instruction oil pressure.

BRIEF DESCRIPTION OF THE DRAWINGS

FIGS. 3(a) and 3(b) are views showing an external appearance configuration of the power transmission device, wherein

DETAILED DESCRIPTION OF EMBODIMENTS OF THE INVENTION

Figure 1:
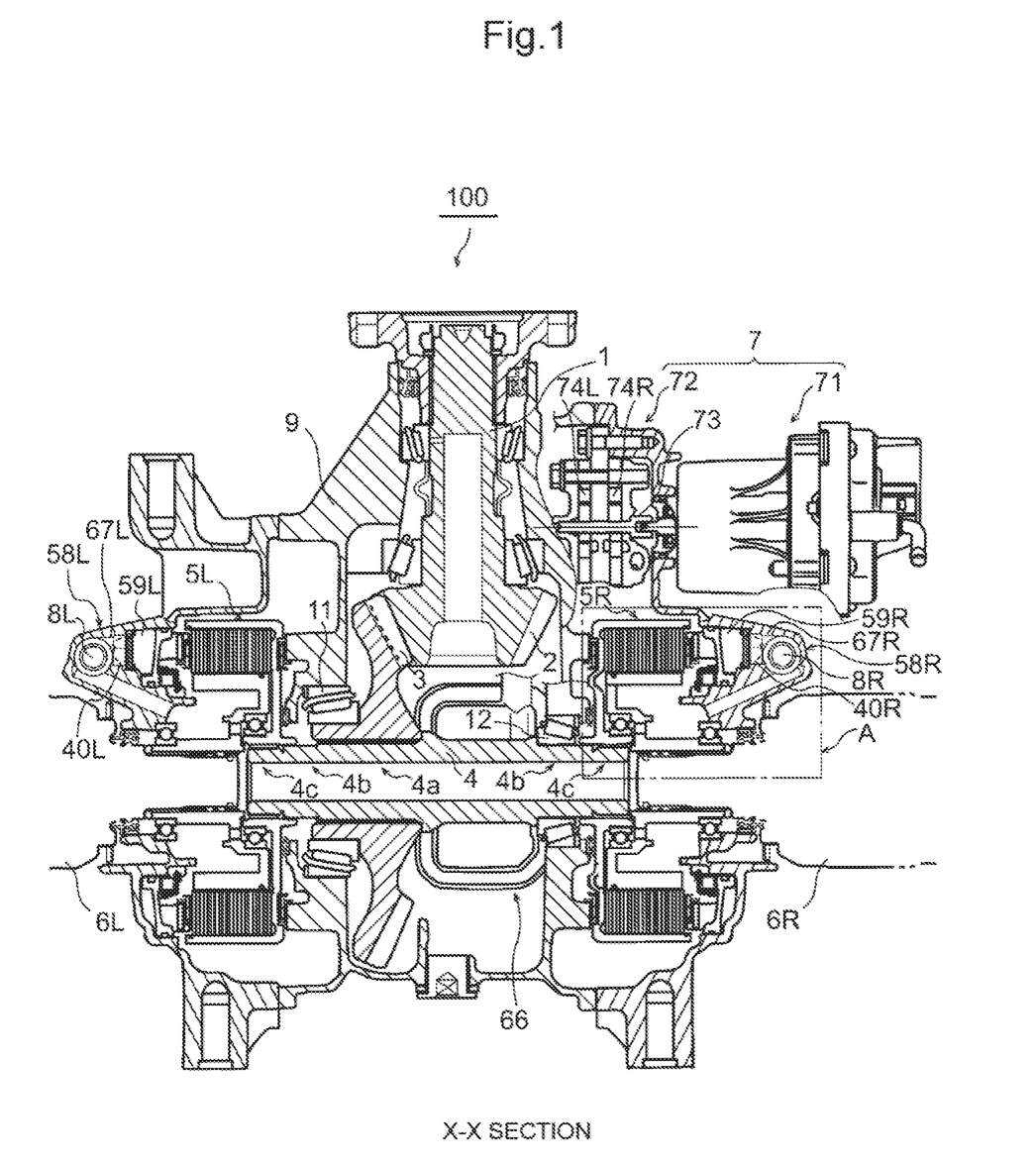
FIG. 1 is a cross sectional view showing the whole configuration of a power transmission device provided with a hydraulic clutch device in accordance with an embodiment of the present invention.
Figure 2:
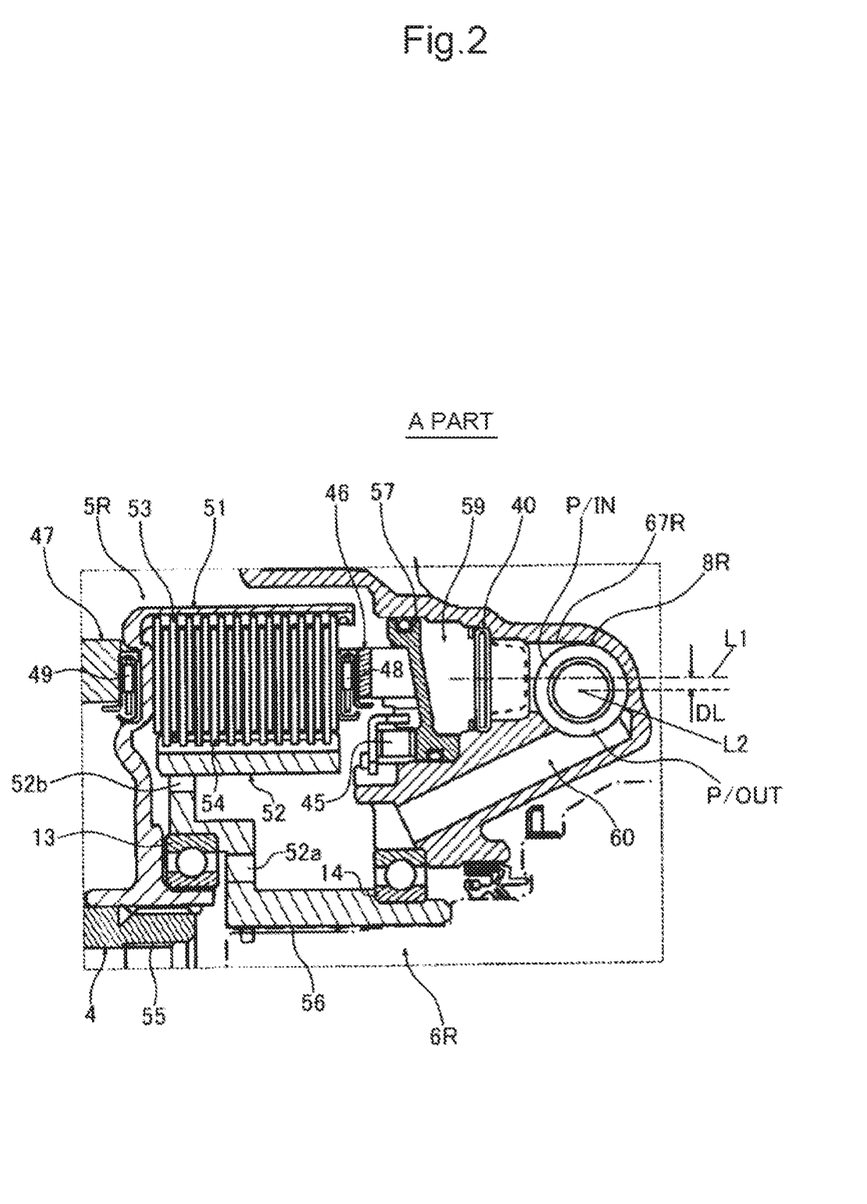
FIG. 2 is an enlarged view of a part A of FIG. 1.
Figure 3:
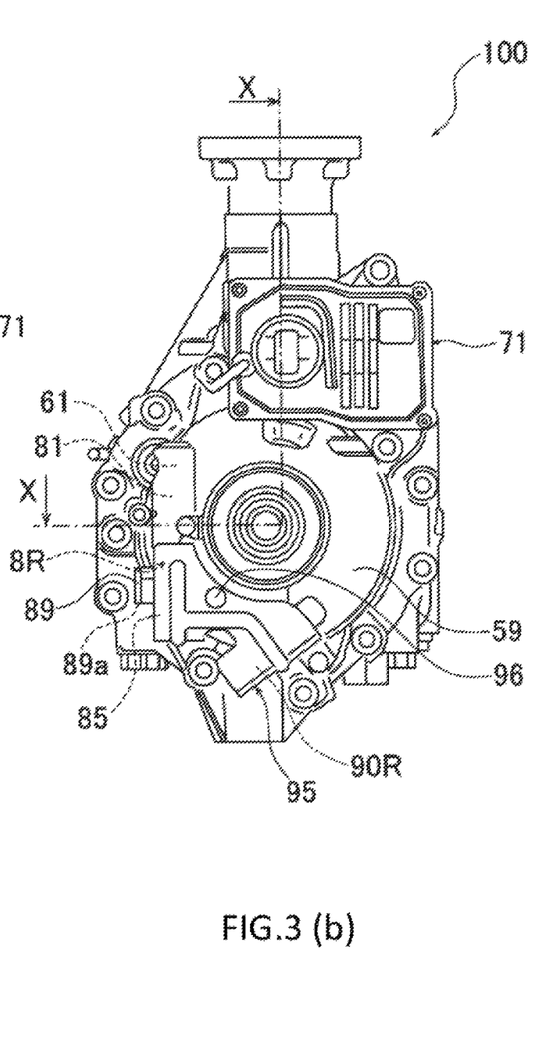
FIG. 3(a) is a plan, view
FIG. 3(b) is a side view.

Hereinafter, an embodiment of the present invention will be explained with reference to accompanying drawings. FIG. 1 is a cross sectional view showing the whole configuration of a power transmission device provided with a hydraulic clutch device in accordance with a first embodiment of the present invention. FIG. 2 is an enlarged view of a part A of FIG. 1. FIG. 3 is a view showing an external appearance configuration of the power transmission device, wherein (a) is a plan view and (b) is a side view.

A power transmission device 100 shown in FIG. 1 is configured as a differential mechanism for distributing a rotation of a drive shaft 1 to left and right wheels (not shown). The drive shaft 1 is joined to a propeller shaft (not shown), and driving force from a driving source (engine) (not shown) is transmitted to the drive shaft. A hydraulic clutch device includes a drive bevel gear 2 which is integrally rotated with the drive shaft 1, a driven bevel gear 3 to be meshed with the drive bevel gear 1, a center shaft (rotation shaft) 4 which is arranged orthogonal to the drive shaft 1 and joined to the driven bevel gear 3 so as to be integrally rotated therewith, left and right hydraulic clutches 5L, 5R arranged on left and right sides of the center shaft 4, left and right output shafts 6L, 6R for transmitting each driving force transmitted by the left and right hydraulic clutches 5L, 5R, to each of left and right wheels (not shown), an oil pump (electric oil pump) 7 for feeding hydraulic fluid (oil) to each of piston chambers 59 (FIG. 2) of the left and right hydraulic clutches 5L, 5R, left and right pressure regulating valves 8L, 8R for regulating a pressure of the oil discharged from each of the piston chambers 59, left and right oil pressure sensors 90L, 90R for detecting an oil pressure of the oil within the left and right piston chambers 59L, 59R, a center casing 9 for covering (housing) the differential mechanism, and side casings 58L, 58R for housing each of the left and right hydraulic clutches 5L, 5R. The left and right side casings 58L, 58R are integrally fixed to openings located on left and right ends of the center casing 9, by fastening bolts 97 (see FIG. 3(a)). Hereinafter, each configuration will be further explained.

The center shaft 4 is pivotally supported on the center casing 9 of the differential mechanism through taper bearings 11, 12. The center shaft 4 is generally configured to include a center large diameter part 4a, medium diameter parts 4b located on the left and right sides of the large diameter part 4a, and small diameter parts 4c located at left and right ends in the vicinity of the medium diameter parts 4b. The driven bevel gear 3 is fixed on the large diameter part 4a, so that the whole of the center shaft 4 is rotated integrally. A plurality of spline teeth are formed in the circumferential direction on each of the small diameter parts 4c located, at the left and right ends of the center shaft 4 and are spline-connected to each of corresponding clutch guides 51 (FIG. 2) of the left and right hydraulic clutches 5L, 5R so as to be integrally rotated therewith.

The left and right hydraulic clutches 5L, 5R are formed of a wet multiple disc clutch. Since the left and right hydraulic clutches 5L, 5R have the same configuration, the explanation herein will foe made, while referring to FIG. 2, with respect to only the right clutch 5R. For the similar reason, in the following explanation, subscripts L, R designating "left" and "right" will be omitted except as otherwise required to distinguish them.

As seen in FIG. 2, a plurality of separator plates (first friction member) 53 are arranged in parallel at predetermined intervals in the axial direction and spline-connected to an inner circumferential surface of the clutch guide 51 serving as an input side rotation member, while a plurality of friction plates (second friction member) 54 are arranged in parallel at predetermined intervals in the axial direction and spline-connected to an outer circumferential surface of a clutch hub 52 serving as an output side rotation member. The separator plates 53 and the friction plates 54 each are alternately arranged in an alternating way with each other in the axial direction thereby to form a layered body of the separator plates 53 and the friction plates 54. At the root of the clutch guide 51 there is formed a spline part 55, and the spline part 55 is spline-connected to the center shaft 4.

Similarly, a spline part 56 is formed close to the root of the clutch hub 52. The spline part 56 is spline-connected to the right output shaft 6R, and the clutch hub 52 is rotatably supported on the side casing 58 through a ball bearing 14 thereby to be rotated integral with the right output shaft 6R. On the other hand, the clutch guide 51 and the clutch hub 52 are mutually borne through a ball bearing 13 so as to be relatively rotatable.

The layered body (the friction engagement part) of the separator plates 53 and the friction plates 54 is driven in the axial direction (in the left direction in FIG. 2) by a piston 57 at the time of engagement of the clutch. The separator plates 53 and the friction plates 54 are frictionally engaged with each other in response to the drive of the piston 57, so that the clutch is engaged. The piston 57 is hydraulically driven toward the friction engagement part by the oil pressure of the piston chamber 59 in opposition to energizing force of a return spring (energizing member) 45 and controlled such that a necessary clutch engagement amount is obtained in the friction engagement part.

At the side opposed to the friction engagement part of the piston 57 there is formed a pressing part 46 which projects in the axial direction (in the left direction in the drawing). The pressing part 46 presses the friction engagement part. At a tip portion of the pressing part 46 there is mounted a first thrust bearing 48 which rotatably supports the friction engagement part in the thrust direction. On the other hand, in a position facing a rear side of the clutch guide 51 of the center casing 9 there is formed a pressing load receiving part 47 which projects in the axial direction (in the right direction in the drawing). The pressing load receiving part 47 receives the pressing load of the piston 57 applied to the friction engagement part. At a tip portion of the pressing load receiving part 47 there is mounted a second thrust bearing 49 which rotatably supports the clutch guide 51 in the thrust direction.

Incidentally, the center shaft 4 corresponds to "an input shaft" for the left and right hydraulic clutches 5L, 5R, and the left and right output shafts 6L, 6R correspond to "an output shaft" for the left and right hydraulic clutches 5L, 5R.

Referring again to FIG. 1, the electric oil pump 7 is composed of a motor part 71 generating rotation power and a pump part 72 which suctions the hydraulic fluid (oil) from an oil strainer 66 (FIG. 3) by the rotation power and forcibly feeds it to the left and right hydraulic clutches 5L, 5R. The pump part 72 has a double pump structure in which two left and right internal gear pumps (oil pumps) 74L, 74R are connected in series with each other on a pump shaft 73. Herein, in this embodiment, the left internal gear pump 74L forcibly feeds the oil to the piston chamber 59L of the left hydraulic clutch 5L, and the right internal gear pump 74R forcibly feeds the oil to the piston chamber 59R of the right hydraulic clutch 5R.

Each of the left and right pressure regulating valves 8L, 8R is formed of a linear solenoid valve (electromagnetic pressure regulating valve). The left and right pressure regulating valves 8L, 8R each in this embodiment are arranged right beside each of the piston chambers 59L, 59R of the left and right hydraulic clutches 5L, 5R in substantially bilateral symmetry. Accordingly, upstream side oil passages 67L, 67R extending from each of the left and right piston chambers 59L, 59R to each of the left and right pressure regulating valves 8L, 8R are constituted at the shortest distance, respectively. Further, filters (secondary filter: cleaning member) 40L, 40R for removing minute foreign matters contained in the hydraulic fluid circulating through the upstream side oil passages 67L, 67R are arranged in the upstream side oil passages 67L, 67R between the piston chambers 59L, 59R and the pressure regulating valves 8L, 8R.

Figure 4:
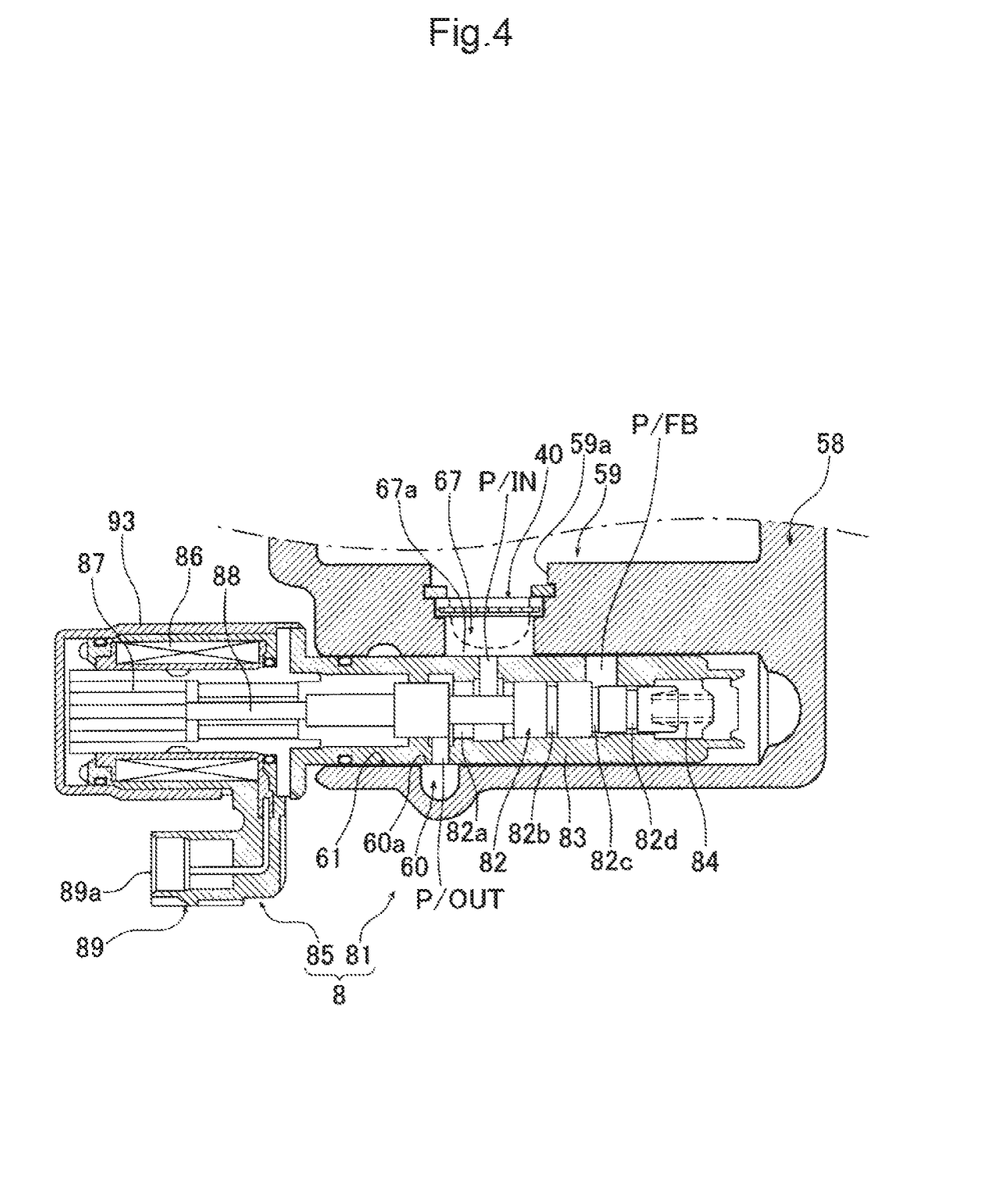
FIG. 4 is a cross sectional view of an essential part of a pressure regulating valve.

FIG. 4 is a cross sectional view of an essential part of the pressure regulating valve 8 (8R). By the way, all of component elements such as the left and right pressure regulating valves 8L, 8R and the like having a subscript L or R in the reference character have the same symmetrical configuration. Therefore, in the following explanation, such subscripts L, R will be omitted except as otherwise required to distinguish them.

The pressure regulating valve 8 is configured in such a way as to connect a linear solenoid part 85 in series to a valve part 81 which is composed of a spool 82, a body 83 and a spring 84. Further, in this pressure regulating valve 8, the valve part 81 is inserted into and housed in an insertion hole 61 formed in the side casing 58, and the linear solenoid part 85 is exposed to the outside of the side casing 58.

The linear solenoid part 85 is composed of a coil 86 which generates lines of magnetic force, a hollow cylindrical magnetic substance 87 which permeably transmits the lines of magnetic force generated by the coil 86, a plunger 88 which is driven in the axial direction, by the action of the lines of magnetic force, a coupler (connector) 89 to which a wiring member (not shown) for supplying electric current to the coil 86 is connected, and a casing 93 for covering the whole. The plunger 88 is joined to an end portion of the spool 82, and the magnetic substance 87 is joined to the body 83. The coupler 89 is a part formed in the shape of projection which projects radially outward from an outer circumferential surface of the linear solenoid part 85, and a joining opening 89a for joining the wiring member thereto is provided at a tip portion of the coupler 89.

An inlet port P/IN, an outlet port P/OUT and a feedback port P/FB each are formed in the body 83, and a plurality of annular oil passages (not shown) are formed between the spool 82 and the body 83. These annular oil passages include an annular oil passage which provides communication between the inlet port P/IN and the outlet port P/OUT and an annular oil passage which is provided in such a manner that the oil discharged from the piston chamber 59 acts on the spool 82 as the feedback pressure. In addition, an aperture (not shown) is formed partially between the side casing 58 and the body 83, so that the oil discharged from the piston chamber 59 flows into the feedback port P/FB through the aperture and acts on the spool 82 as the feedback pressure.

Accordingly, the oil flowing into the inlet port P/IN of the pressure regulating valve 8 from the piston chamber 59 of the hydraulic clutch 5 through the upstream side oil passage 67 (filter) 40 is pressure-regulated to the oil pressure with which three force composed of the feedback pressure (oil pressure) of the oil discharged from the piston chamber 59, the thrust of the plunger 88 of the linear solenoid part 85, and the elastic force acting on the valve body by the spring 84 is balanced, and is discharged to a downstream side oil passage 60 from the outlet port P/OUT of the pressure regulating valve 8.

Further, since the pressure regulating valve 8 is arranged in the vicinity of the outside of the piston chamber 59, the oil passage from the piston chamber 59 to the inlet port P/IN of the pressure regulating valve 8 can be connected at the shortest distance, so that the pressure loss of the upstream side oil passage 67 extending from the piston chamber 59 to the pressure regulating valve 8 can be minimized. In addition, as will be described later, the oil discharged from the outlet port P/OUT of the pressure regulating valve 8 can be introduced into an interior of the hydraulic clutch 5 not through a shaft axis oil passage formed in the inside of the shaft.

Referring again to FIG. 2, in the interior of the side casing 58 there is formed the downstream side oil passage 60 by which the oil discharged from the outlet port P/OUT of the pressure regulating valve 8 is led directly to the interior of the hydraulic clutch 5. In other words, in the hydraulic clutch device of this embodiment, the oil discharged from the outlet port P/OUT of the pressure regulating valve 8 is introduced directly into the interior of the hydraulic clutch 5 through the downstream side oil passage 60 without the intervention of the oil passage (the shaft axis oil passage) formed in the inside of the shaft, and the introduced oil is stirred by the rotation of the clutch hub 52, whereby rotational sliding parts such as the ball bearings 13, 14 and the like are lubricated. Therefore, a first through hole 52a is provided in a part of the clutch hub 52 facing the ball bearing 13 in such a manner that the oil introduced into the interior of the hydraulic clutch 5 through the downstream side oil passage 60 efficiently and evenly spreads over the ball bearings 13, 14. Moreover, a second through hole 52b passing through between an inner circumferential surface and an outer circumferential surface in the radial direction of the clutch hub 52 is provided in such a manner that the oil efficiently and evenly spreads over the separator plates 53 and the friction plates 54.

As seen in FIG. 3, the pressure regulating valve 8 (8L, 8R) and the oil pressure sensor 90 (90L, 90R) are mounted in the side casing 58 (58L, 58R) which houses the hydraulic clutch 5. Specifically, the pressure regulating valve 8 is inserted into and fixed to the insertion hole 61 which is provided in a lateral surface on the outside of the side casing 58 (on the outside in the axial direction of the center shaft 4). Moreover, the oil pressure sensor 90 is fixed to another insertion hole (not shown) provided in the lateral surface on the outside of the side casing 58, in a condition where a part thereof is inserted into the insertion hole. A part of the oil pressure sensor 90 is arranged within the piston chamber 59 through the insertion hole so as to detect the oil pressure within the piston chamber 59. In addition, a coupler (connector) 91 for connecting the wiring member is exposed outwardly of the side casing 58.

Further, a cover (protection member) 95 (95L, 95R) is provided so as to cover at least a part of these pressure regulating valve 8 and oil pressure sensor 90 which are exposed from the side casing 58. The cover 95 is made of metallic press-formed component and configured so as to cover an outer lateral surface and a rearward end surface in the longitudinal direction of the linear solenoid part 85 of the pressure regulating valve 8, and an outer lateral surface of the oil pressure sensor 90. This cover 95 is fixedly secured to an outer surface (surface facing the outside in the axial direction of the center shaft 4) of the side casing 58 by fastening a bolt (fastener) 96. Herein, the cover 95 may be an integrally molded component of a synthetic resin and the like, other than the above metallic press-formed component.

Figure 5:
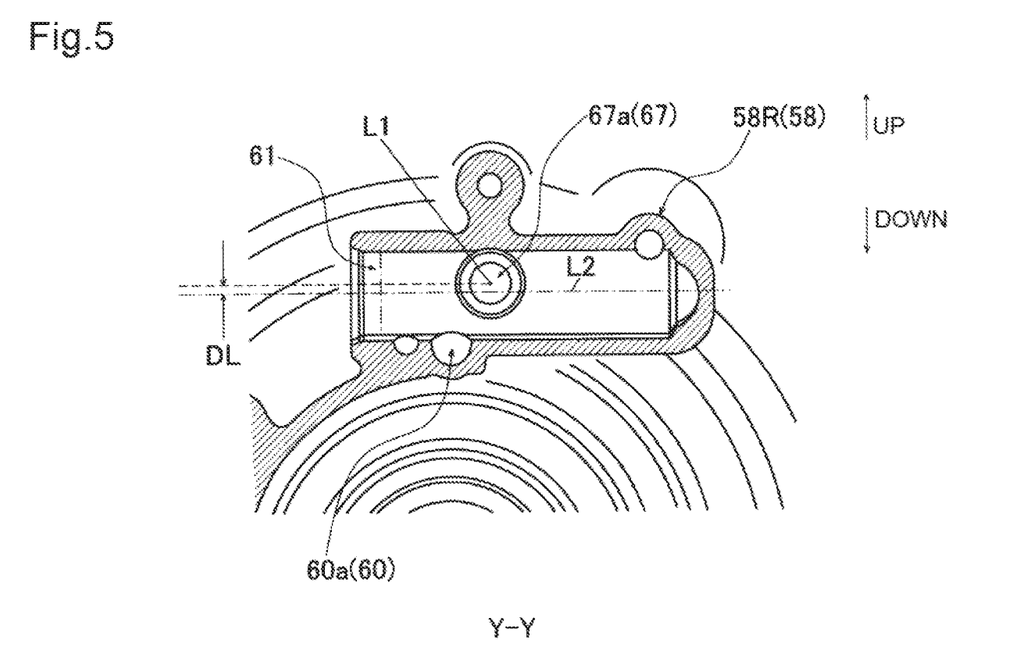
FIG. 5 is a side cross sectional view showing an insertion hole of the pressure regulating valve provided in a side casing.
Figure 6:
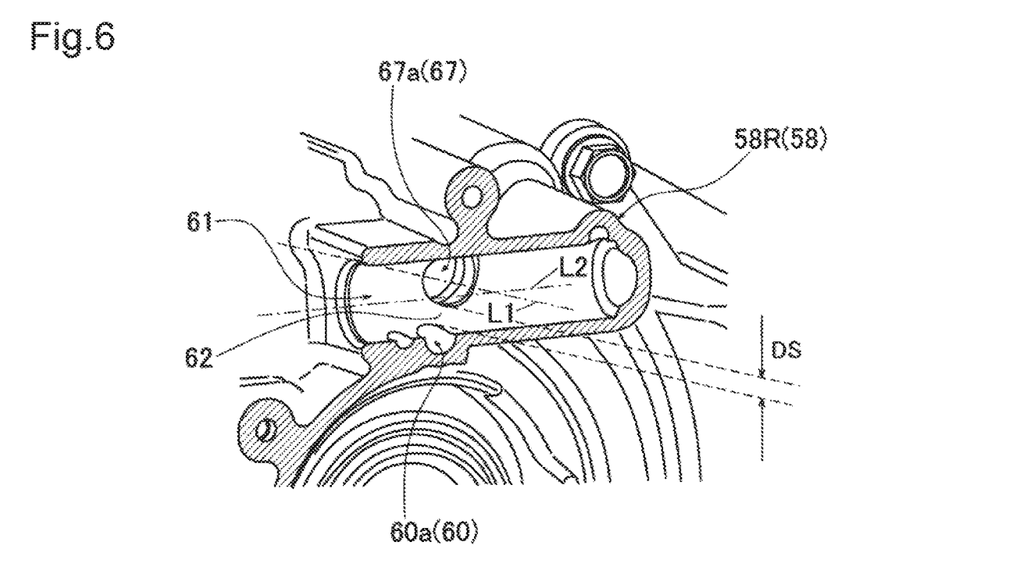
FIG. 6 is a perspective view, partly in cross section, showing the insertion hole.

FIGS. 5 and 6 are views shoving the insertion hole 61 of the pressure regulating valve 8 provided in the side casing 58, wherein FIG. 5 is a side cross sectional view of a part of the side casing 58 taken along arrowed line Y-Y of FIG. 3(a), and FIG. 6 is a perspective view of the part corresponding to the section taken along arrowed line Y-Y. The hydraulic clutch device of this embodiment has the cylindrical (substantially cylindrical) insertion hole 61 provided in the side casing 58 for fitting the valve part 81 of the pressure regulating valve 8 therein, the upstream side oil passage 67 which communicates from the piston chamber 59 (recess 59a) to the insertion hole 61, and the downstream side oil passage 60 which communicates from the insertion hole 61 to the downstream side. An axial direction of the insertion hole 61 extends substantially horizontally in the forward and backward direction of the power transmission device 100. An opening part 67a of the upstream side oil passage 67 is opened at a lateral surface (one side in the left and right direction with respect to the vertical direction of an outer circumferential surface) of the insertion hole 61, and an opening part 60a of the downstream side oil passage 60 is opened at a lower surface (in the vertically downward direction of the outer circumferential surface) of the insertion hole 61.

Further, a height position (a position in the vertical direction in a condition where the hydraulic clutch device and the power transmission device 100 are loaded in the vehicle. The same applies hereunder.) of a first virtual line L1 which passes through the center-of-gravity point (the center point) of a cross section of the opening part 67a along the axial direction (longitudinal direction) of the upstream side oil passage 67 and a height position of a second virtual line L2 which passes through the center-of-gravity point (the center point) of a cross section of the insertion hole 61 along the axial direction (longitudinal direction) of the insertion hole 61 are arranged so as to be different (offset) from each other, and there is provided a difference (offset amount) DL (see FIG. 5) in height between these virtual lines. Specifically, the first virtual line L1 is offset to the upper side in the height direction from the second virtual line L2. With this configuration, as seen in FIG. 6, the opening part 67a of the upstream side oil passage 67 and the opening part 60a of the downstream side oil passage 60 with respect to the insertion hole 61 are not directly connected to each other, and a seal part 62 (seal width DS) constituted by the inner circumferential surface of the insertion hole 61 is provided between these openings. By this seal part 62, it is possible to obtain such a seal effect that the oil flowing into the insertion hole 61 from the opening part 67a of the upstream side oil passage 67 is prevented from directly flowing out to the opening part 60a of the downstream side oil passage 60. Herein, the center-of-gravity point of the cross section of each of the upstream side oil passage 67 and the insertion hole 61 corresponds to the center point when the cross section of each of the upstream side oil passage 67 and the insertion hole 61 is in the shape of a circle, while the center-of-gravity point is different from the center point when the cross section is other shape than the circle and the center point does not correspond to the center-of-gravity point.

Further, as seen in FIG. 6, the first virtual line L1 and the second virtual line L2 are located in a position perpenicular to each other. In other words, the first virtual line L1 and the second Virtual line L2 are not parallel to each ether and the height positions thereof are different from each other, so that they are located m a positron not to intersect with each other.

Further, in the hydraulic clutch device of this embodiment, letting a resistance pressure (filter resistance pressure) (or it may be a conduit resistance pressure of the upstream side oil passage 67.) applied to the oil which passes though the filter 40 be P1, a resistance pressure (port resistance pressure) applied to the oil which flows though each port of the pressure regulating valve 8 be P2, a conduit resistance pressure (resistance pressure applied to the oil which flows through the downstream side oil passage 60) of the downstream side oil passage 60 be P3, and the oil pressure within the piston chamber 59 balancing with the load (the load that returns the piston 57 in a direction to separate from the friction engagement elements 53, 54) of a return spring 45 of the hydraulic clutch 5 be P4, the length dimension, the diameter dimension and the like of the conduit of the upstream side oil passage 67 and the downstream side oil passage 60 are set such that the relation P1+P2+P3<P4 holds. With this configuration, the piston 57 can be returned in the direction to separate from the friction engagement elements by energization of the return spring 45, in a state of lacking the instruction oil pressure of the hydraulic clutch.

As explained above, in Use hydraulic clutch device of this embodiment, the pressure regulating valve 8 is located on the downstream side in the oil flowing direction of the hydraulic clutch 5, and there are provided the side casing 58 for housing the hydraulic clutch 5, the insertion hole 61 provided in the side casing 58, the upstream side oil passage 67 introducing the oil discharged from the hydraulic clutch 5, into the insertion hole 61, and the downstream side oil passage 60 leading out the oil to the downstream side of the insertion hole 61. Then, the height position of the first virtual line L1 which passes through the center-of-gravity point of a cross section of the opening part 67a of the upstream side oil passage 67 and the height position of the second virtual line L2 which passes through the center of a cross section of the insertion hole 61 are arranged so as to be different from each other. In this case, the first virtual line L1 and the second virtual line L2 are located in a position perpendicular to each other.

According to the hydraulic clutch device of the present invention, since the position of the center-of-gravity point (the center) of a cross section of the opening part 67a of the upstream side oil passage 67 and the position of the center-of-gravity point (the center) of a cross section of the insertion hole 61 are arranged so as to be different (offset) from each other, it is possible to ensure the seal part 62 (the seal width DS) between the opening part 67a of the upstream side oil passage 67 and the opening part 60a of the downstream side oil passage 60 in the inner circumferential surface of the insertion hole 61 even if the diameter dimension of the downstream side oil passage 60 is increased. Therefore, the oil flowing into the insertion hole 61 from the opening part 67a of the upstream side oil passage 67 can be effectively prevented from flowing out directly from the opening part 60a of the downstream side oil passage 60 without the intervention of the pressure regulating valve 8. Thus, the oil can be prevented from flowing directly (the so-called "shortcutting") into the downstream side oil passage 60 from the upstream side oil passage 67 without passing though the interior of the insertion hole 61 (the pressure regulating valve 8) while reducing the resistance (the conduit resistance) of the downstream side oil passage 60 by increasing the diameter dimension of the downstream side oil passage 60, so that it is possible to ensure the operation performance of the pressure regulating valve 8. Accordingly, the discharge capacity of the oil which is discharged to the downstream side of the pressure regulating valve 8 through the downstream side oil passage 60 is improved, whereby to prevent the operation pressure from being generated in a hydraulic clutch 5 in a state of lacking the instruction oil pressure. Thus, it is possible to reduce the possibility of causing a disadvantage such as dragging and the like in the hydraulic clutch 5.

Further, in this hydraulic clutch device, the first virtual line L1 is located on the higher side than the second virtual line L2 in the height direction. According to this configuration, since the first virtual line L1 is located above the second virtual line L2 in the height direction, the center of the opening part 67a of the upstream side oil passage 67 is arranged in a higher position than the center of the insertion hole 61. Therefore, since, the center of the opening part 60a of the downstream side oil passage 60 can be arranged in a lower position than the center of the insertion hole 61, the discharge capacity of the oil which is discharged through the downstream side oil passage 60 can foe further improved. Further, since the seal part 62 (the seal width DS) between the opening part 67a of the upstream side oil passage 67 and the opening part 60a of the downstream side oil passage 60 can be made larger in dimension, the oil can be more effectively prevented from flowing directly into the downstream side oil passage 60 from the upstream side oil passage 67 without passing though the interior of the insertion hole 61 (the pressure regulating valve 8).

Further, in this hydraulic clutch device, the diameter dimension and the length dimension of the upstream side oil passage 67 and the downstream side oil passage 60 are set such that the combined pressure of the resistance pressure (P1) applied to the oil which passes through the filter 40, the resistance pressure (P2) applied to the oil which passes through the pressure regulating valve 8, and the resistance pressure (P3) applied to the oil which circulates though the downstream side oil passage 60 is smaller than the oil pressure (P4) of the piston chamber 59 which balances with the load applied to the piston 57 from the return spring 45 (P1+P2+P3<P4). Herein, when the filter 40 located in the upstream side oil passage 67 is not provided, the resistance pressure (P1) applied to the oil which passes through the filter 40 may be replaced with the conduit resistance pressure value of the oil circulating the upstream side oil passage 67, in the above relational expression of the pressure.

According to this configuration, since the piston 57 can be returned by the load of the return spring 45 in the direction to separate from the friction engagement elements 53, 54 in a state of lacking the instruction oil pressure of the hydraulic clutch 5, the generation of the operation pressure within the piston chamber 59 of the hydraulic clutch 5 can be effectively prevented. Therefore, it is possible to more effectively reduce the possibility of causing the disadvantage such as dragging and the like in the hydraulic clutch 5.

While the embodiment of the present invention has been explained, the present invention is not limited to the above referred embodiment, and it is understood that various changes and modifications may be made in the invention within the appended claims and the scope of technical ideas described in the specification and drawings.

The invention claimed is:

1. A hydraulic clutch device comprising:
   a hydraulic clutch;
   an oil pump configured to supply oil to the hydraulic clutch;
   a pressure regulating valve configured to pressure-regulate the oil supplied from the oil pump and located on a downstream side of the hydraulic clutch in an oil flowing direction such that the hydraulic clutch is engageable by the oil pressure-regulated by the pressure regulating valve;
   a casing housing the hydraulic clutch and having an insertion hole to which at least a part of the pressure regulating valve is inserted and fitted therein;
   an upstream side oil passage receiving the oil discharged from the hydraulic clutch and having a first opening part which opens into the insertion hole so as to introduce the oil discharged from the hydraulic clutch, via the first opening part, into the pressure regulating valve provided in the insertion hole; and
   a downstream side oil passage receiving the oil discharged from the insertion hole and having a second opening part which opens into the insertion hole so as to discharge the oil from the pressure regulating valve provided in the insertion hole, via the second opening part, to the downstream side of the insertion hole,
   wherein the first opening part of the upstream side oil passage and the insertion hole of the casing are arranged such that a first virtual line which defines a center axis of the upstream side oil passage passing through a center-of-gravity point of a cross section of the first opening part of the upstream side oil passage and a second virtual line which defines a center axis of the insertion hole passing through a center-of-gravity point of a cross section of the insertion hole extend in different directions from each other.

2. The hydraulic clutch device according to claim 1, wherein the first opening part of the upstream side oil passage and the insertion hole of the casing are arranged such that the first virtual line and the second virtual line are in directions perpendicular to each other.

3. The hydraulic clutch device according to claim 2, wherein the first opening part of the upstream side oil passage and the insertion hole of the casing are arranged such that the first virtual line is positioned above the second virtual line in a height direction.

4. The hydraulic clutch device according to claim 1, wherein the hydraulic clutch comprises:
   friction engagement members provided in a power transmission route;
   a pressing member configured to apply pressing force to the friction engagement members;
   an oil chamber having the oil introduced therein so as to drive the pressing member by an oil pressure of the introduced oil; and
   a pressurized member configured to push the pressing member in a direction to separate from the friction engagement members in opposition to the oil pressure in the oil chamber,
   wherein the upstream side oil passage is in fluid-communication from the oil chamber to the insertion hole, and
   wherein each diameter and each length of the upstream side oil passage and the downstream side oil passage are set such that a combined pressure of a resistance pressure on the oil which flows through the upstream side oil passage, a resistance pressure on the oil which passes through the pressure regulating valve, and a resistance pressure on the oil which flows through the downstream side oil passage is smaller than the oil pressure in the oil chamber which balances with a load applied to the pressing member from the pressurized member.

* * * * *